United States Patent
Reeves, Jr. et al.

(10) Patent No.: US 7,580,989 B2
(45) Date of Patent: Aug. 25, 2009

(54) SYSTEM AND METHOD FOR MANAGING ACCESS POINTS TO DISTRIBUTED SERVICES

(75) Inventors: Charles R. Reeves, Jr., Snohomish, WA (US); Andrew D. Milligan, Redmond, WA (US); Lucas R. Melton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1255 days.

(21) Appl. No.: 10/620,803

(22) Filed: Jun. 30, 2003

(65) Prior Publication Data

US 2005/0055442 A1 Mar. 10, 2005

(51) Int. Cl.
G06F 15/167 (2006.01)
(52) U.S. Cl. .................. 709/217; 709/203; 709/223; 709/227
(58) Field of Classification Search ................ 709/203, 709/204, 205, 217, 223, 250
See application file for complete search history.

(56) References Cited

U.S. PATENT DOCUMENTS 6,510,461 B1 * 1/2003 Nielsen .................... 709/224
2004/0213409 A1 * 10/2004 Murto et al. .............. 380/258

* cited by examiner

Primary Examiner—William C Vaughn, Jr.
Assistant Examiner—Scott Christensen
(74) Attorney, Agent, or Firm—Workman Nydegger

(57) ABSTRACT

A system and method comprising a client-side manager component that manages access points (such as URLs) to distributed services for client applications. The client application hosts the client-side manager, and specifies criteria for a service. The manager component uses the criteria to query a service registry, such as a UDDI-based registry, and caches the returned list. To use a service, the client calls the manager component on a defined interface, and the manager component returns one of the cached access points. The cached access points may be returned based on an ordering, such as to distribute requests among services. If the service fails, the client calls a failure-related method of the manager component with failure details, and retrieves a new access point. The manager component reports the error to an error handling service, whereby the error information may be used in a quality of service statistic at the service registry.

26 Claims, 5 Drawing Sheets

SYSTEM AND METHOD FOR MANAGING ACCESS POINTS TO DISTRIBUTED SERVICES

FIELD OF THE INVENTION

The invention relates generally to computer systems and networks, and more particularly to distributed services.

BACKGROUND OF THE INVENTION

There are many types of computing services, resources and data that computer users and applications need to manage and otherwise access, such as services and data maintained on corporate networks and other remotely accessible sites including intranets and the internet. As there are many different computing platforms, various platform-independent mechanisms and protocols that facilitate the exchange of network information are becoming commonplace, including HTTP (HyperText Transfer Protocol), XML (eXtensible Markup Language), XML Schema, and SOAP (Simple Object Access Protocol). The concept of web services, in which businesses, organizations, and other providers offer services to users and applications, is based on these standards.

To be of value, web services need to enable users and applications to locate them, and exchange the information needed to execute them. To this end, UDDI (Universal Description Discovery & Integration) provides a set of defined services (e.g., in a universal business registry) that help users and applications discover such businesses, organizations, and other web services providers, along with a description of their available web services and the technical interfaces needed to access those services. Although such services may be provided over the internet, services also may be provided in an enterprise environment or other intranet, where the services and their usage may be more controlled. Thus, not just UDDI, but other service registries (such as one based on Microsoft Corporation's Active Directory®) may provide a way of locating a distributed service.

However, at present, client applications do not have a consistent way to interact with such service directories and the services listed thereby. At the same time, many of the services are essentially redundant with respect to their functionality, however client applications do not know a great deal about these services, other than that a type of service is needed, and the type of interfaces that will be needed. Clients may wish to be more selective. For example, the client application may not only want to specify a type of service to the service registry, but also may want to indicate that it does not want just any access point (reference) to a service that matches the type, as the client does not want a service that is often unavailable, unreliable or slow. What is needed is a way for client applications to interact with services through service registries, in a manner that is convenient, straightforward and provides access points that meet client expectations for services.

SUMMARY OF THE INVENTION

Briefly, the present invention provides a system and method comprising a client-side management component that manages access points (e.g., references such as URLs) to distributed services for client applications. The client application may host the client-side management component (referred to in the examples herein as a managed URL component), or otherwise communicate with the management component in some way. In general, to use a service, a client application specifies criteria for a requested type of service. The search criteria expresses constraints that identify the set of services that could support the required interaction, and may include quality of service requirements, such as return the best N services with respect to a quality of service level that matches a needed type.

The managed URL component communicates the criteria to the service registry, which in turn returns a list of those services that match the criteria. For example, when the service registry is a UDDI server, such a request may comprise a "Find" message. The managed URL component then caches the returned list. Among other things, the managed URL component thus encapsulates the caching behavior that supports runtime discovery of redundant service access points available in a service registry. The managed URL component uses this information to establish a set of access points (comprising references such as URLs) that will support the role identified by the constraints listed in the search criteria. The list may be ordered as desired, such as by an algorithm, randomly, or as specified by the client.

When access is desired each time a service is to be used, the client application calls a Value property in the managed URL component. In response to this call, the managed URL component returns one of the access points to a suitable service (e.g., a URL or similar reference) to the client application program, which may then communicate with the service to perform some quantum of work. With each call for a service, the managed URL component may cycle through the services on its internally cached list in a round-robin fashion so as to distribute the client application's work among the essentially redundant services.

If the service hosted at that access point (a URL in the examples) fails to provide adequate support, the client application calls a FailOver( ) method of the managed URL component, and retrieves another URL (e.g., the next URL from the cached list) using the Value property. In the cache, the FailOver( ) method may mark the access point as failed, so as to essentially remove the access point from the service selection list, whereby it will not be again returned to the application via the Value property unless and until the list is refreshed.

The managed URL component also provides a general technique for generating quality of service information for these services as a way of improving service availability. To this end, when the FailOver( ) method is called, the Managed URL can send an error report to the Error Handling Service, including the identity of the service that failed, and some detail indicating the client's perspective on the cause of the failure.

The error handling service collects the failure information over some period of time and calculates a quality of service statistic. Based on this statistic, the error handling service may update (or be used as a factor in updating) the quality of service data of the service information record in the service registry. As a result of the updated quality of service statistic for a given service, services may move up and down with respect to quality of service, whereby the list returned in response to a query having quality of service criterion may vary over time to give the services with the highest quality of service (e.g., highest availability).

Other advantages will become apparent from the following detailed description when taken in conjunction with the drawings, in which:

DETAILED DESCRIPTION

Exemplary Operating Environment

Figure 1:
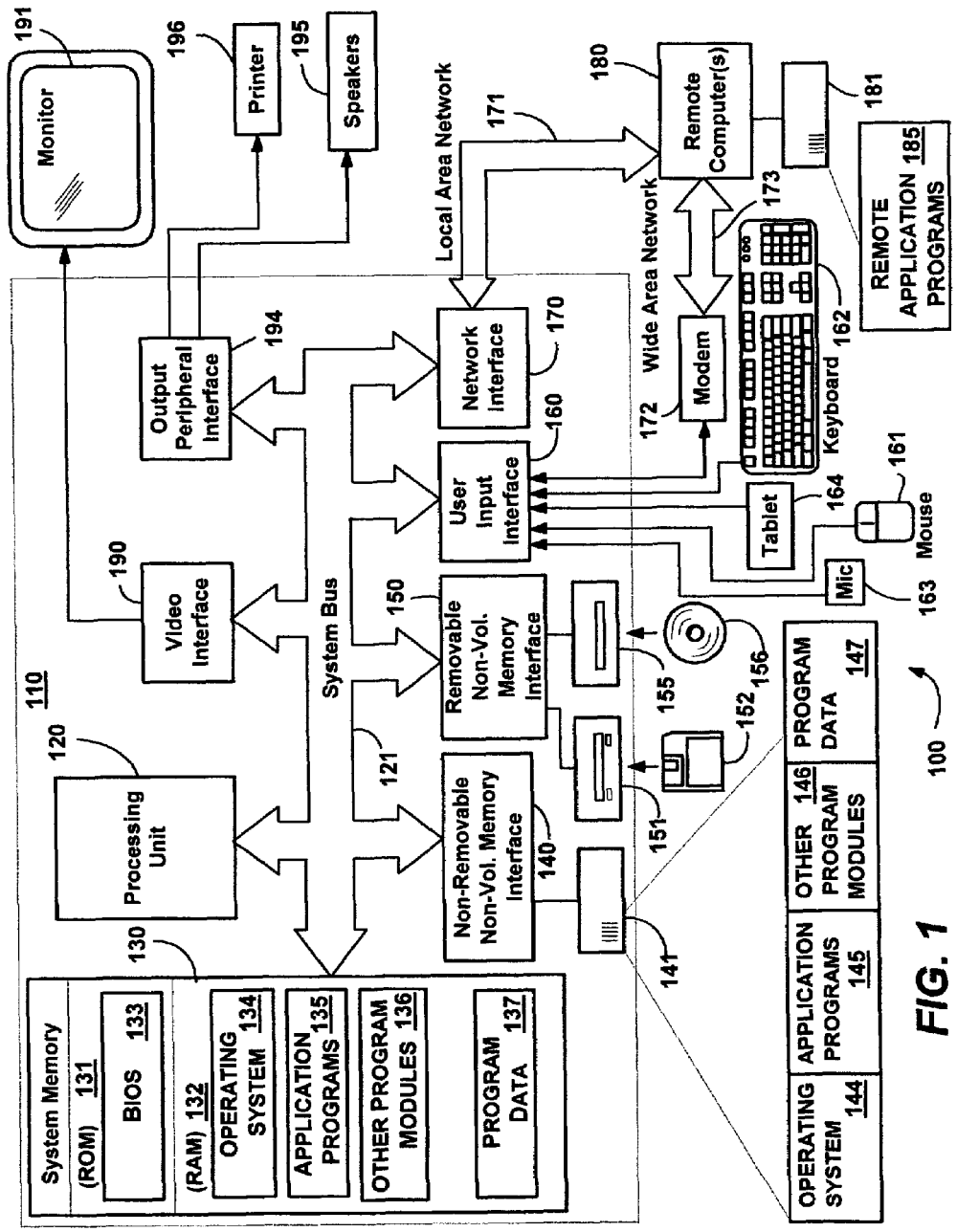
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Managing Access Points to Distributed Services

The present invention is in part, generally directed towards distributed network services, in which a client running on essentially any platform may use a defined protocol such as SOAP (Simple Object Access Protocol) to access network services over UDDI. However, the present invention is not limited to network services, which can include things such as business-related services (e.g., product/media sales, stock quotes or tax services), and also services such as printing, scanning or other RPC-like facilities over a network, but applies to services distributed in virtually any manner, e.g., within software and/or hardware in a standalone computing system, or among devices in a home environment that are not conventionally thought of as networked, such as a service on a media player. Thus, it should be understood that although network services and URLs (Uniform Resource Locators) are used in the examples herein, the present invention is not limited to network services and URLs, but rather works with any distributed services (whether conventionally thought of as software-based, hardware-based or both), and/or with any way of identifying access points to those services, of which URLs are only one example. As used herein, "access points" are any documentable address or other identifier by which a service can be accessed, such as a network address in any form, a URL, a URI, SQL connection, and so forth. This includes any identifier that can be resolved by some mechanism to an application or a particular instance of an application.

Further, the present invention is primarily described as being incorporated as a component hosted by an application program, e.g., an instantiated object that encapsulates the methods and data that provide the structure and/or functionality of the present invention. However, it should be understood that the hosted component is only an example implementation, and that virtually any mechanism or combination of mechanisms that can communicate with a program, such as another program, an operating system component accessible through an application programming interface, a specialized network service, and so forth, are equivalent. Further, the management component may reside on the same or a different machine, e.g., on an intermediary node or hosted in some other process. Thus, the management component may be coupled in any way, directly or indirectly, to an application program instance (and possible others). For example, a management component may publish its data to some shared memory, whereby multiple client applications that require that same services may share the access points.

Moreover, the client "application" may itself be a distributed program/service, and may be any type of program, including what is considered to be a more conventional application program, an operating system component, a driver, and so forth. Thus, as used herein, "application" may also include programs that are not traditionally considered to be application programs.

Figure 2:
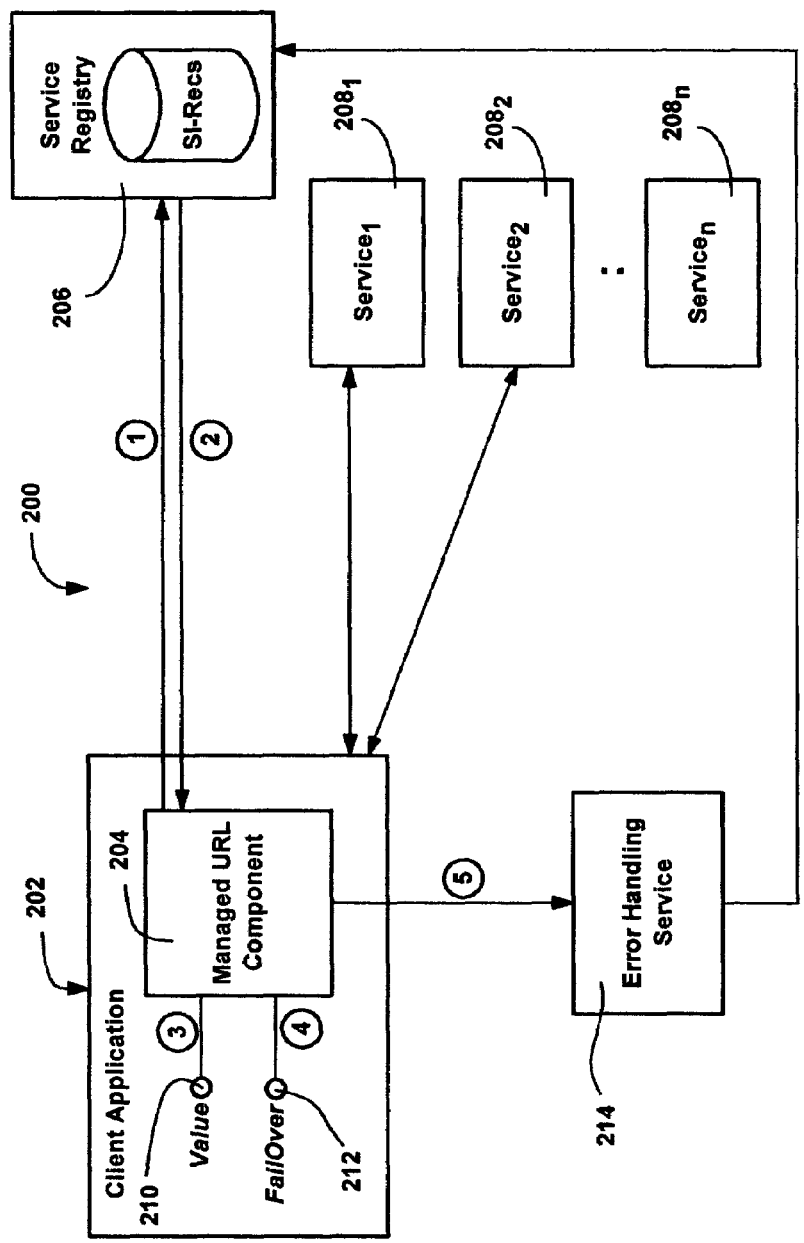
FIG. 2 is a block diagram generally representing a client application in a distributed services environment including components and mechanisms configured in accordance with an aspect of the present invention.

Turning to FIG. 2 of the drawings, there is shown an example distributed services environment 200 such as a network, in which a client application program hosts (a reference to) a managed URL component 204 in accordance with an aspect of the present invention. For example, the managed URL component 204 may comprise an instantiated object. As will be understood, a primary benefit of the managed URL component 204 is that it abstracts the management of access points to distributed services, thereby removing the need to do so by the application program 202.

In general, and as represented in FIG. 2 via the arrows labeled with circled numerals one (1) and two (2), the managed URL component 204 communicates with a service registry 206 to obtain access points to distributed services $208_1$-$208_2$. For example, in a UDDI-based (Universal Description Discovery & Integration) environment, the UDDI-based service registry 206 ordinarily will return one or more URLs identifying the locations of the service or services, while in a different environment such as an enterprise network, the service registry (e.g., Active Directory®-based) may return access points in the form of UNC (Uniform Naming Convention) names. In the examples herein, the service registry will return URLs in a UDDI environment, hence the name of the hosted component as being a managed "URL" component 204 in these examples even though URLs are only one example.

Figure 3:
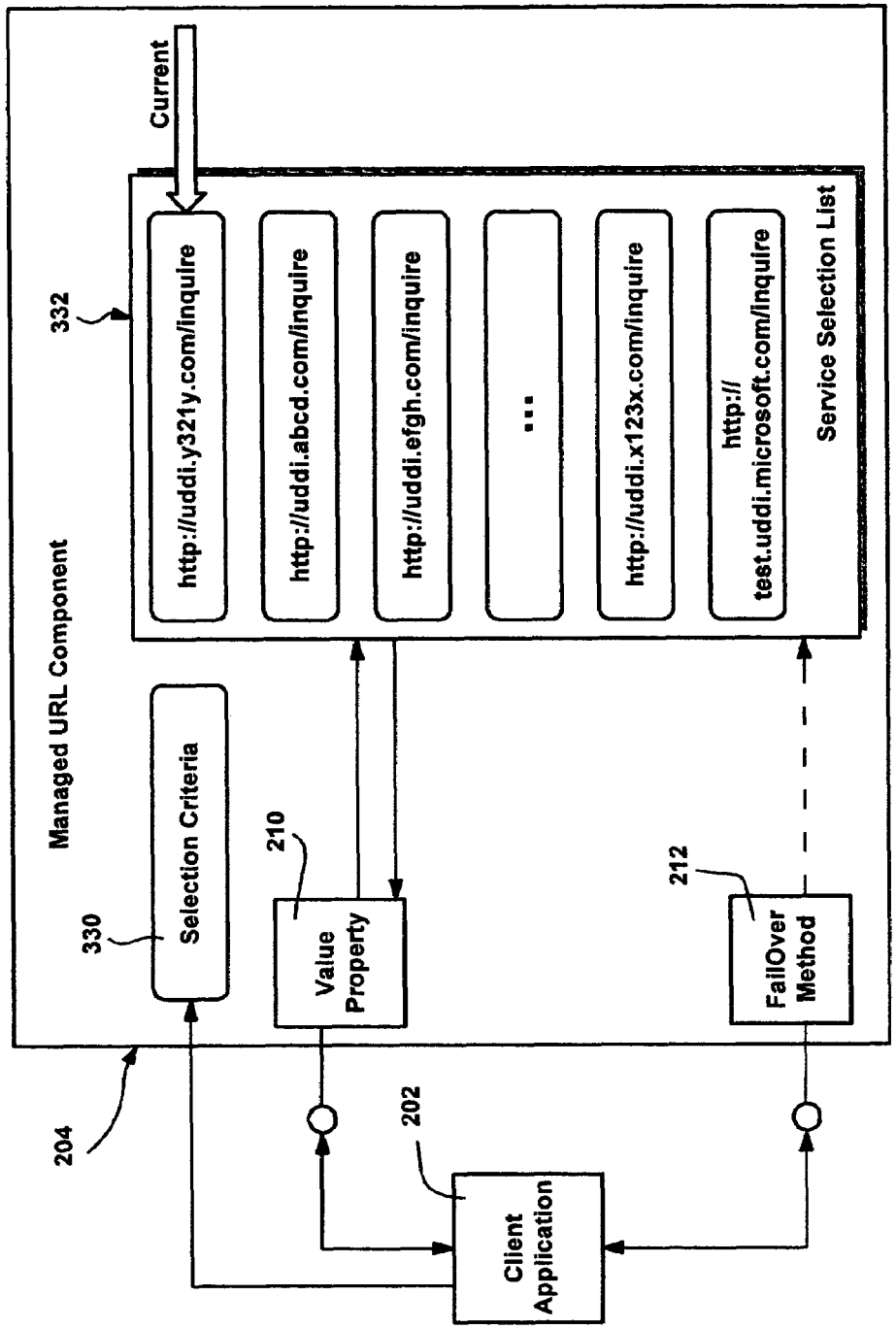
FIG. 3 is a block diagram generally representing a managed URL component that manages access points to services and provides client applications with access to properties/methods, in accordance with an aspect of the present invention.

As represented in FIG. 3, the client application 202 provides selection criteria 330 to the managed URL component 204, such as via a parameter during instantiation, or via a defined interface (not shown). The selection criteria 330 defines the type of service that the client application 202 is seeking, along with other information, such as interface references, categorization type constraints, cost limitations, a maximum number of access points to services (URLS) to return, and so forth. Also, in keeping with an aspect of the present invention as described below, the application 202 may specify quality of service data such as a minimum acceptable level of quality of service that a service (for which an access point is returned) needs to have.

The managed URL component 204 constructs a suitable query from the selection criteria as needed to communicate with the service registry 206 (FIG. 2), and provides the query to the service registry 206. The query is sent to the service registry 206 as a distributed request. For example, in a UDDI-based environment, the query comprises a UDDI "Find" request.

The service registry 206 uses the criteria to find a list of matching services that are registered therewith, sorting and truncating as necessary to match the query, and returns the selections to the managed URL component 204. In turn, the managed URL component 204 caches the list, e.g., as part of its internal data, represented as a service selection list 332 in FIG. 3. In the example of FIG. 3, these are the URLs identified as http://uddi.y321y.com/inquire;

http://uddi.abcd.com/inquire, http://uddi.efgh.com/inquire, http://uddi.x123x.com/inquire and http://test.uddi.microsoft.com/inquire, although there may be many others as represented by the ellipsis in the list 332.

In accordance with an aspect of the present invention, to obtain an access point to a service, the managed URL component 204 provides a Value property 210, which when invoked (labeled with circled numeral three (3) in FIG. 2) returns one of the access points (e.g., as a string) from the list 332. In the present example of FIG. 3, the current URL that is returned is http://uddi.y321y.com/inquire. A mechanism in the managed URL component 204 tracks which URL is the current URL, as presented by the arrow labeled "Current" in FIG. 3. As is understood, a URL is only an example of the type of reference data that can be managed, and virtually any environment-unique identifier (such as a path to a file on a network share) that is appropriate for a given environment may be managed and returned in response to a Value call.

The service selection list 332 may be ordered in any way, such as randomly, or according to an order as specified by the client application 202, or by some algorithm implemented by the managed URL component 204 and/or service registry 206. For example, the list can be ordered by specifying a dimension, so as to use one service as a primary service to return, another as a secondary service if the primary fails, and another as a tertiary (catastrophic) in the event the primary and secondary services fail. The list may be ordered by quality of service, e.g., so that the primary has the best ranking, and so forth. The order may be kept via an actual sequential order (e.g., in an array), or according to some other indexing or weighting scheme.

Further, as described below, the ordering may be used to distribute the client application's workload among the services. For example, using a round-robin feature as described below, the application 202 can obtain a service reference, use that service to perform some quantum of work, and when again requesting that a service reference be returned, be given the next one in the (circular) list 332. In this manner, for example, given four service references in the list 332, the calls will be distributed twenty-five percent to each, alternating among those four services (provided they remain operational) according to the order.

In accordance with another aspect of the present invention, if a problem occurs with a service, e.g., the quality of service drops, the client application calls a FailOver method 212 of the managed URL component 204, which is labeled with circled numeral four (4) in FIG. 2). Via the FailOver method 212, the managed URL component 204 marks the reference as being problematic, including internally so as to maintain this with respect to the access points in the cache 332. Note that if a service fails while round-robin distributioning or some other scheme is active, that service reference can be effectively removed from the list (e.g., marked as failed), whereby the distribution would be among only those access points remaining. The list 332 may be refreshed when some minimum number of service references remain, which may be when none remain. As described below, the application 202 can again call the Value property 210 to obtain a new service reference access point. In an alternative implementation, the FailOver method 212 may automatically return a new service reference in response to the problem, e.g., essentially by calling the Value property on behalf of the client application.

It can be readily appreciated that the interfaces to the Value and FailOver functionality provide a generic way for applications to receive access points to distributed services and indicate problems, respectively. Thus, the application is generally not concerned with concepts such as how the services are selected, located and/or identified, such as by URL or otherwise. Instead, the client application program is only required to specify criteria for desired services, then request access points (which are returned in the proper form for a given environment), and identify any failures. Such abstraction makes it straightforward for application developers to implement distributed services.

In keeping with the present invention, to provide quality of service data, the FailOver method 212 calls an error handling service 214, providing the identity of the current service, along with data (e.g., details) of the failure. Note that similar such error handling functionality is already present in contemporary operating systems to report software problems, however some failure reporting services prompt the user as to whether to send a report, whereas the present invention is capable of automatic reporting, such that the user need not be involved.

In general, the error handling service 214 collects the failure information for the service, such as over a period of time, and calculates a quality of service statistic. Based on this statistic, the error handling service may update (or be used as a factor in updating) the QOS property of an information record (the SI-Recs in FIG. 2) for that service that is associated with the service registry 206. Note that in a typical scenario, many such error handling services among different machines in a network will contribute to overall quality of service values for the various services. Further, note that the value may be based on a failure percentage, such that a failure does not always lower the quality of service, but rather the frequency of failure may be used to determine a ranking. As a result of the updated quality of service statistic for a given service, services may move up and down with respect to quality of service rankings, whereby the list returned in response to a query having quality of service criterion may vary over time.

Further, not all failures need be considered equally. By way of example, bad client data and/or a protocol violation by the client may cause an error, but such an error was caused by the client, not the service, and thus the error handling service may not weight the error heavily, if at all, in determining the quality of service value for the service that was currently selected at the time of failure. In contrast, bad server data, a busy, slow or not responding service, can lower a service's quality of service measurement, with possibly different weights for each type of failure.

The following represents some generalized pseudo-code, in which the application provides the search criteria, calls the Value property 210 to obtain a service reference access point to perform work, and calls the FailOver method 212 (e.g., with any failure details) if there is an exception that catches a failure:

```
class ManagedUrlUser
{
  static bool done = false;
  static void Main( string[ ] args )
  {
    //
    // Populate search criteria . . .
    //
    string criteria = "SELECT Services WHERE QOS > 50 AND . . . ";
    ManagedUrl murl =
    new ManagedUrl( new UddiConnection( ), criteria );
    while( !done )
    {
      try
      {
        Work( murl.Value );
      }
      catch
      {
        //
        // The service failed. Report the error and
        // its details; use the next available service.
        //
        murl.FailOver(true, details);
      }
    }
  }
  static void Work( string url )
  {
    //
    // Interact with Service
    //
    // Throw Exceptions when the service is unavailable
    //
  }
}
```

Figure 4:
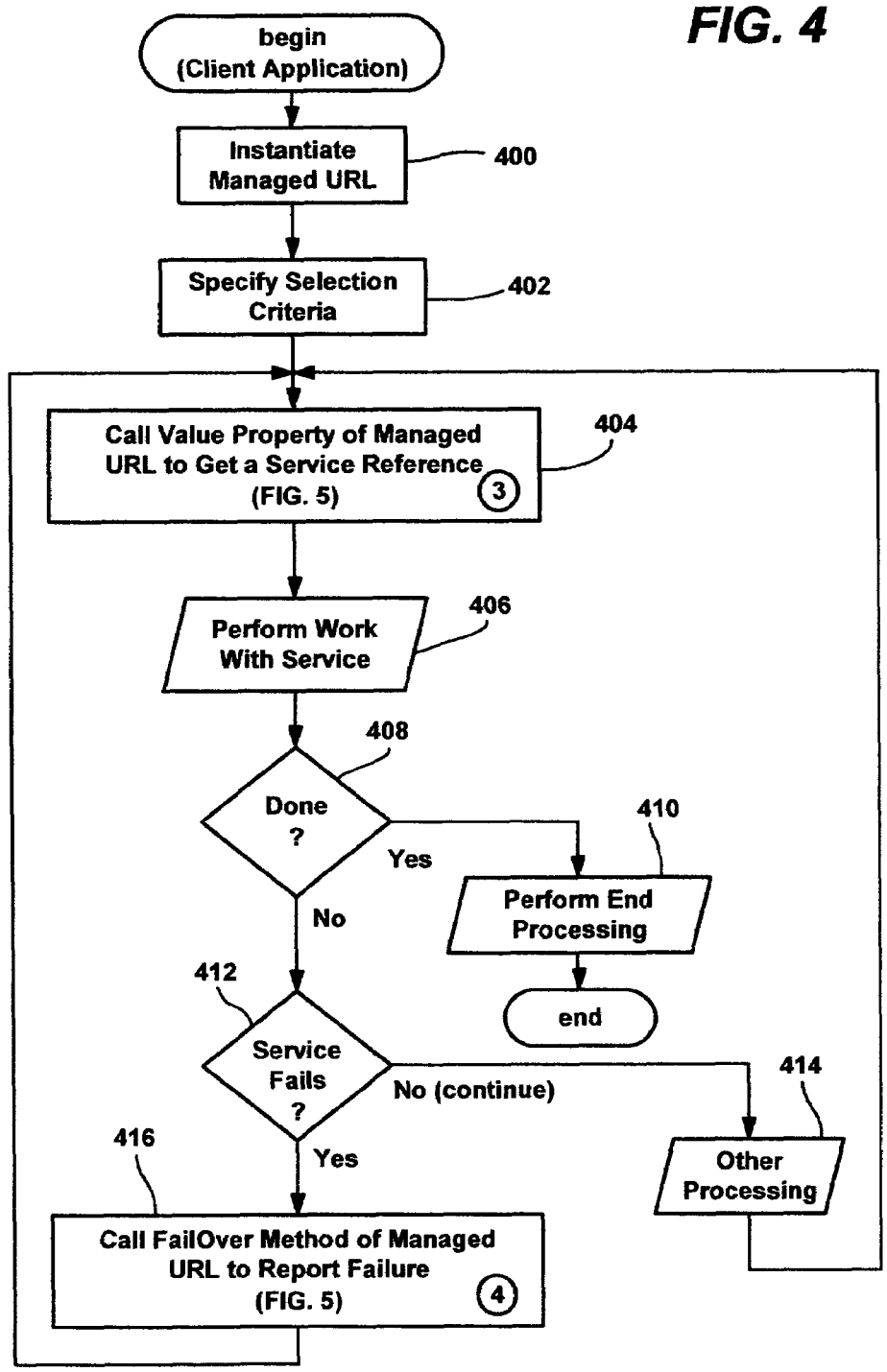
FIG. 4 is a flow diagram generally representing the operations of a client application to use the managed URL component and services, in accordance with an aspect of the present invention.
Figure 5:
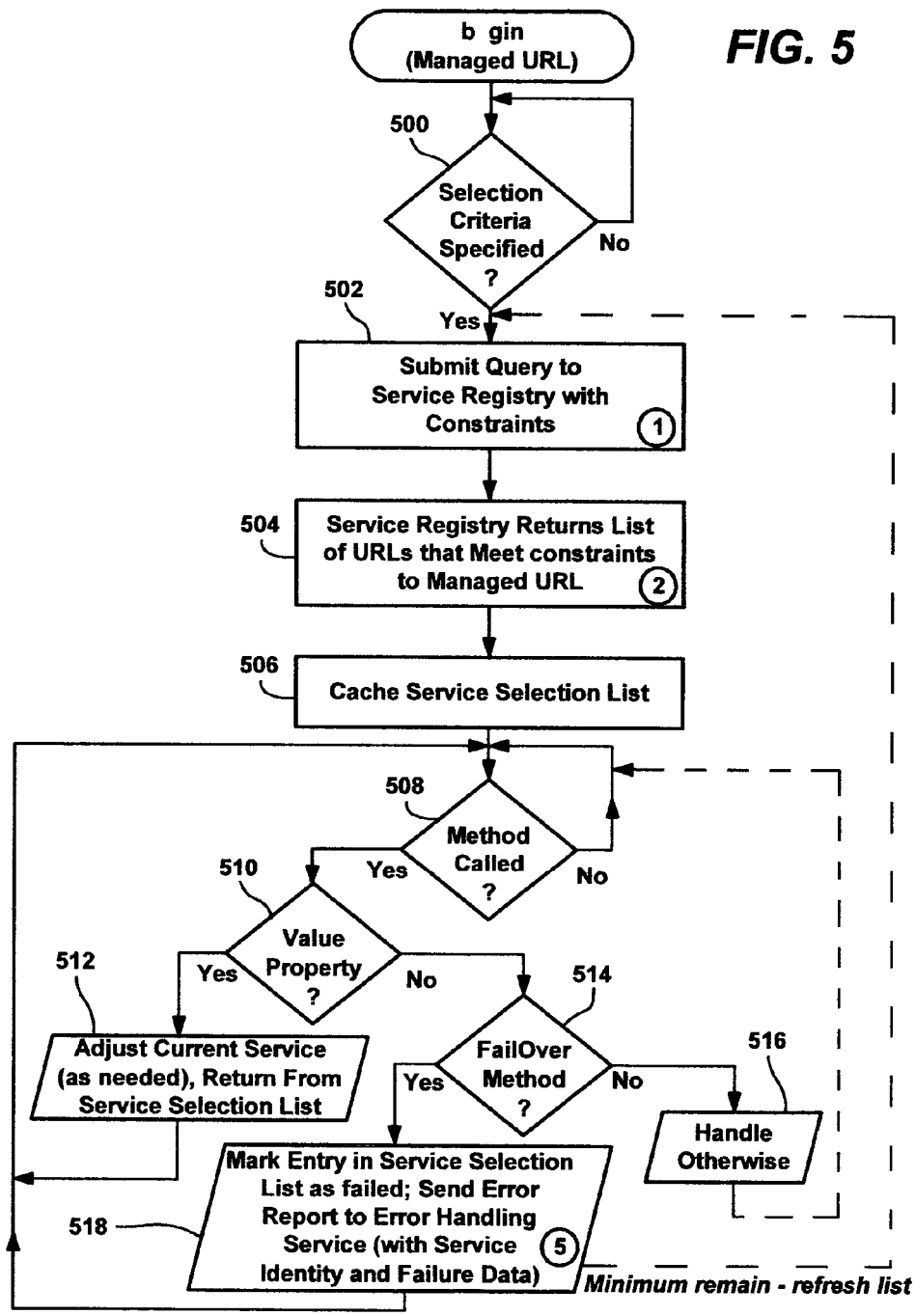
FIG. 5 is a flow diagram generally representing the operations of the managed URL component, in accordance with an aspect of the present invention.

Turning to an explanation of the operation of the present invention, FIG. 4 is a flow diagram that generally represents actions taken by the application program 202, while FIG. 5 is a flow diagram that generally represents actions taken by the managed URL component 204. Note that in FIGS. 4 and 5, the circled numerals in some of the blocks generally correspond to the circled numerals accompanying the arrows in FIG. 2.

It should be noted that the logic in FIGS. 4 and 5 are only examples for purposes of simplicity in explanation, and that other ways of performing the general actions are feasible. For example, FIGS. 4 and 5 show some of the operations in loops, whereas at least some of the actual logic may be event driven and/or handled by appropriate calls to an appropriate interface. Further, note that although FIGS. 4 and 5 work in conjunction with one another, FIG. 4 primarily will be described herein before FIG. 5, so as to avoid repeatedly having to switch between the descriptions of the operations of the application program 202 and the managed URL component 204.

FIG. 4 represents the actions of the application 202, beginning at step 400 wherein the managed URL component 204 is instantiated, or otherwise bound to, by the application program 202. Step 402 represents the application 202 specifying the selection criteria to the managed URL component 204. This corresponds to step 500 of FIG. 5 branching to step 502, 504 and 506 to obtain and cache the list, as described below. Note that in FIG. 4, steps 400 and 402 may have intermediate steps therebetween. For example, as in the pseudocode shown above, there may be some initialization that takes place.

Step 404 represents the calling of the Value property of the managed URL component 204 to get an access point to a service, (which corresponds to steps 508, 510 and 512 of FIG. 5). Note that step 404 may have to wait until the managed URL component 204 obtains the list from the service registry 206 (FIG. 2), as described below with reference to steps 502, 504 and 506 of FIG. 5.

Once the access point is returned, the client application 202 can access the service to perform some work, as represented in FIG. 4 via step 406. Although not specifically shown, the application can also do other processing while working with a service at step 406, e.g., output results as they are received from the service. Step 408 represents a way for the client to end the process, after performing any end processing at step 410, which may include outputting the results of the work performed at step 406, and/or closing and cleaning up the managed URL component 204. Once ended, the client may restart the process of FIG. 4 as desired. For purposes of the present example, at step 408 the application program is considered as not being done with using the services that met the criteria at this time, and thus step 408 continues to step 412.

If the service has not failed, as represented by the evaluation step 412, the process branches back to step 404 to again call the value property the next time a service is needed to perform work. Note that as represented by step 414, there may be substantial other processing that the application performs between the times of working with a service, such as to output the results of the work performed with the service between calls.

Steps 412 and 416 represent handling the failure of a service, essentially by calling the FailOver method of the managed URL component 204 to report the failure (step 416), which may include providing the details of the failure. Steps 514 and 518 of FIG. 5, described below, represent the failure handling operations of the managed URL component 204 that generally correspond to following the failure handling call by the application 202 at step 414.

FIG. 5 represents the general operations of the managed URL component 204 following instantiation, beginning at step 500 which generally represents waiting for the selection criteria to be specified. Once received, step 502 submits a query to the service registry 506, along with the constraints specified in the criteria. For example, the query may comprise a "Find" request to a UDDI-based service registry.

At step 504, the list of access points (e.g., URLs) is returned, and cached at step 506. Note that the list may be empty, in which case an error message or the like may be returned to the client application, instead of an OK status or the like. Alternatively, if empty, an error may be returned later, in response to the call to the Value property, instead of returning an access point.

Step 508 represents the general handling process of the managed URL component 204, which step 510 and 512 handle if the value property is called, while steps 514 and 518 handle if the FailOver method is called. Step 516 represents handling any other methods, such as to terminate this instance of the managed URL component 204.

Step 512 adjusts the current reference pointer as necessary, according to the rules that are present. For example, if round-robin distribution is occurring, the reference pointer will be moved to the next access point (reference) in the list that has not been marked as failed, circling back to the top of the list if the bottom is reached. Step 512 then returns the (possibly new) current access point from the service selection list, and returns to step 508 which represents waiting for another method call.

Step 516 represents the failure processing in the managed URL component 204, which marks the current entry in the service selection list as failed, and sends an error report to error handling service, including the identity of the current service and the failure data (e.g., details and/or an errorcode). As described above, the error handling service may collect the failure information over some period of time to calculates a QOS statistic, which it uses to update the QOS property of the service information record in the service registry to indicate the current level of availability. In an alternative implementation, the service registry may be sent the information directly, to perform its own statistical or other handling.

Note that in the described implementation, step 518 does not return a new access point reference, but rather (consistent with FIG. 4) requires the application to again call the Value property (steps 508, 510 and 512) to obtain a new access point. In the event that the list is exhausted to some minimum (typically zero), step 518 returns to step 502 to refresh the list, as represented in FIG. 5 by the dashed line from step 518 back to step 502.

As can be seen from the foregoing detailed description, there is provided a method and system by which client applications may consistently interact with service directories and the services listed thereby. Via a pluggable or other convenient manager component, clients may provide criteria that specifies requirements of a distributed service, including quality of service requirements, and thereafter the manager component point manages the access points to the services for the client. The client application only needs interface with the component to receive service access point data and to notify the component of service failures, whereby the system and method provide a convenient and straightforward mechanism for interacting with distributed services. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
    requesting access points for accessing distributed services that match specified criteria, the access points being requested from a service registry;
    in response to the request; receiving a plurality of access points to a plurality of distributed services, each of the plurality of distributed services matching the specified criteria, the access points being received from the service registry;
    maintaining the plurality of access points in a cache, wherein the plurality of access points are maintained in an ordering;
    receiving a request from a program to provide an access point;
    in response to the request, selecting a first access point from the cache based on the ordering and returning data of the first access point to the program, the first access point for accessing a first distributed service;
        wherein the program uses the data from the first access point to access the first distributed service; and
    receiving information from the program that the first distributed service which is accessed using the first access point has failed;
    based on the received information that the first distributed service which is accessed using the first access point has failed:
        selecting a second access point from the cache, the second access point for accessing a second distributed service,
        returning data of the second access point to the program, and
        marking the data from the first access point which is used to access the failed distributed service such that the first access point is not subsequently selected from the cache;
    wherein the data from the first access point and the data of the second access point comprises a network address of a computer system, wherein the network address can be resolved by some mechanism to an application or a particular instance of an application.

2. The method of claim 1 wherein the program provides the specified criteria.

3. The method of claim 2 wherein the service registry comprises a UDDI-based registry, and wherein sending the query to the service registry comprises sending an UDDI find request.

4. The method of claim 3 wherein the plurality of access points is provided by the service registry in a list of URLs, and wherein returning data of an access point comprises returning data comprising a URL.

5. The method of claim 1 wherein receiving a request from a program for an access point comprises receiving a call at a defined interface.

6. The method of claim 1 further comprising, basing the ordering on data received from the program.

7. The method of claim 1 further comprising, basing the ordering on quality of service data.

8. The method of claim 1 wherein choosing the access point based on the ordering comprises choosing the access point that is first in the ordering of those access points that have not been marked as having failed.

9. The method of claim 1 wherein choosing the access point based on the ordering comprises choosing the access point that is next in the ordering.

10. The method of claim 1 further comprising updating the service registry based on the failure data.

11. The method of claim 1 wherein outputting failure data comprises communicating with an error handling service.

12. The method of claim 11 further comprising collecting failure information at the error handling service.

13. The method of claim 1 wherein receiving information that a distributed service has failed comprises receiving a call at a defined interface.

14. A computer-readable storage medium having stored computer executable instructions for performing the method of claim 1.

15. In a computer network in which a service registry provides access points to distributed services for use by client programs, a system comprising:
 a storage media that maintains a plurality of access points provided by the service registry; and
 a manager component coupled to the client program, the manager component configured to perform the following:
  receive a request from the client program for access points for accessing distributed services that match specified criteria, the request including the specified criteria;
  in response to the request from the client program, request access points from the service registry, the access points for accessing distributed services that match the specified criteria;
  receive from the service registry data corresponding to a plurality of access points to a plurality of distributed services, each of the plurality of distributed services matching the specified criteria;
  store the data corresponding to the plurality of access points in the storage, wherein the data corresponding to the plurality of access points are stored in an ordering;
  receive a request for one of the plurality of stored access points from the client program;
  in response to the request, select a first access point from the storage based on the ordering and provide the data corresponding to the first access point to the client program, the first access point for accessing a first distributed service;
  receive information from the client program that the first distributed service which is accessed using the first access point has failed; and
  based on the received information that the first distributed service which is accessed using the first access point has failed:
   select a second access point from the storage,
   provide the data corresponding to the second access point to the client program, the second access point for accessing a second distributed service, and
   mark the data corresponding to the first access point as having failed such that the first access point is not subsequently provided in response to a request for an access point
  wherein the data from the first access point and the data of the second access point comprises a network address of a computer system, wherein the network address can be resolved by some mechanism to an application or a particular instance of an application.

16. The system of claim 15 wherein the manager component comprises an instantiated object.

17. The system of claim 16 wherein the storage comprises a list maintained in storage allocated to the manager component object.

18. The system of claim 15 wherein the client program hosts the manager component.

19. The system of claim 15 wherein the manager component is coupled to the client program via a defined interface that receives the request for the access point.

20. The system of claim 15 wherein the service registry comprises a UDDI-based registry.

21. The system of claim 15 wherein the service registry comprises a UDDI-based registry, wherein the query comprises a UDDI find request, and wherein each access point received in response to the query comprises a URL string.

22. The system of claim 15 wherein the selection of the first and second access points is based on an ordering scheme.

23. The system of claim 15 wherein the manager component includes a defined interface for receiving failure-related calls related to a distributed service.

24. The system of claim 23 wherein at least one failure-related call includes information that indicates the failure.

25. The system of claim 23 further comprising an error handling service, the manager component providing failure information to the error handling service including information that indicates which service failed.

26. The system of claim 25 wherein the error handling service collects the failure information, and updates data associated with the service registry and corresponding to the service that failed.

* * * * *